US008500531B1

(12) United States Patent
Magin

(10) Patent No.: US 8,500,531 B1
(45) Date of Patent: Aug. 6, 2013

(54) SINGLE PLAYER CARD GAME

(76) Inventor: Christopher Magin, Tonawanda, NY (US)

( * ) Notice: Subject to any disclaimer, the term of this patent is extended or adjusted under 35 U.S.C. 154(b) by 378 days.

(21) Appl. No.: 13/073,434

(22) Filed: Mar. 28, 2011

(51) Int. Cl.
- *A63F 9/00* (2006.01)
- *A63F 13/00* (2006.01)
- *G06F 17/00* (2006.01)
- *G06F 9/24* (2006.01)

(52) U.S. Cl.
USPC ............. 463/11; 463/16; 273/274; 273/292; 273/309

(58) Field of Classification Search
USPC .............................. 463/16; 273/274, 292, 309
See application file for complete search history.

(56) References Cited

U.S. PATENT DOCUMENTS

| | | | |
|---|---|---|---|
| 5,078,403 A | 1/1992 | Chernowski, Jr. | |
| 6,547,247 B2 | 4/2003 | Hoyt et al. | |
| 6,655,688 B2 | 12/2003 | Boateng | |
| 7,404,763 B2 * | 7/2008 | Malone et al. | 463/13 |
| 7,614,946 B2 | 11/2009 | Nicely | |
| 2003/0020237 A1 | 1/2003 | Boateng | |
| 2003/0141663 A1 | 7/2003 | Leitch | |
| 2005/0140093 A1 | 6/2005 | Hoopman | |
| 2006/0022408 A1 | 2/2006 | McGinnis | |
| 2006/0038348 A1 | 2/2006 | Schultz | |
| 2007/0284819 A1 | 12/2007 | Ledger | |
| 2008/0018050 A1 | 1/2008 | Lutnick et al. | |
| 2008/0029962 A1 * | 2/2008 | Darling | 273/292 |
| 2008/0315525 A1 | 12/2008 | Hoyt et al. | |
| 2009/0061397 A1 * | 3/2009 | Treloar | 434/129 |
| 2009/0278314 A1 | 11/2009 | Benzakarya | |

* cited by examiner

*Primary Examiner* — Omkar Deodhar
*Assistant Examiner* — Reginald Renwick
(74) *Attorney, Agent, or Firm* — Simpson & Simpson, PLLC

(57) ABSTRACT

A method of playing a game, comprising (a) providing a plurality of cards, wherein each card has a first side having indicia thereon representative of a first value for each card, (b) placing the cards in a row, the first side of each card not viewable, wherein the row comprises a plurality of positions, wherein each card occupies one of the positions, and wherein each position corresponds to a second value, wherein the second value for each position is determined by counting from either end of the row, (c) revealing the first side of a selected card, (d) determining a subset of valid cards based on the first value of the selected card and the at least one second value of each position, and (e) repeating steps (c) and (d) with subsequently selected cards from the subset of valid cards until the subset of valid cards is empty.

19 Claims, 6 Drawing Sheets

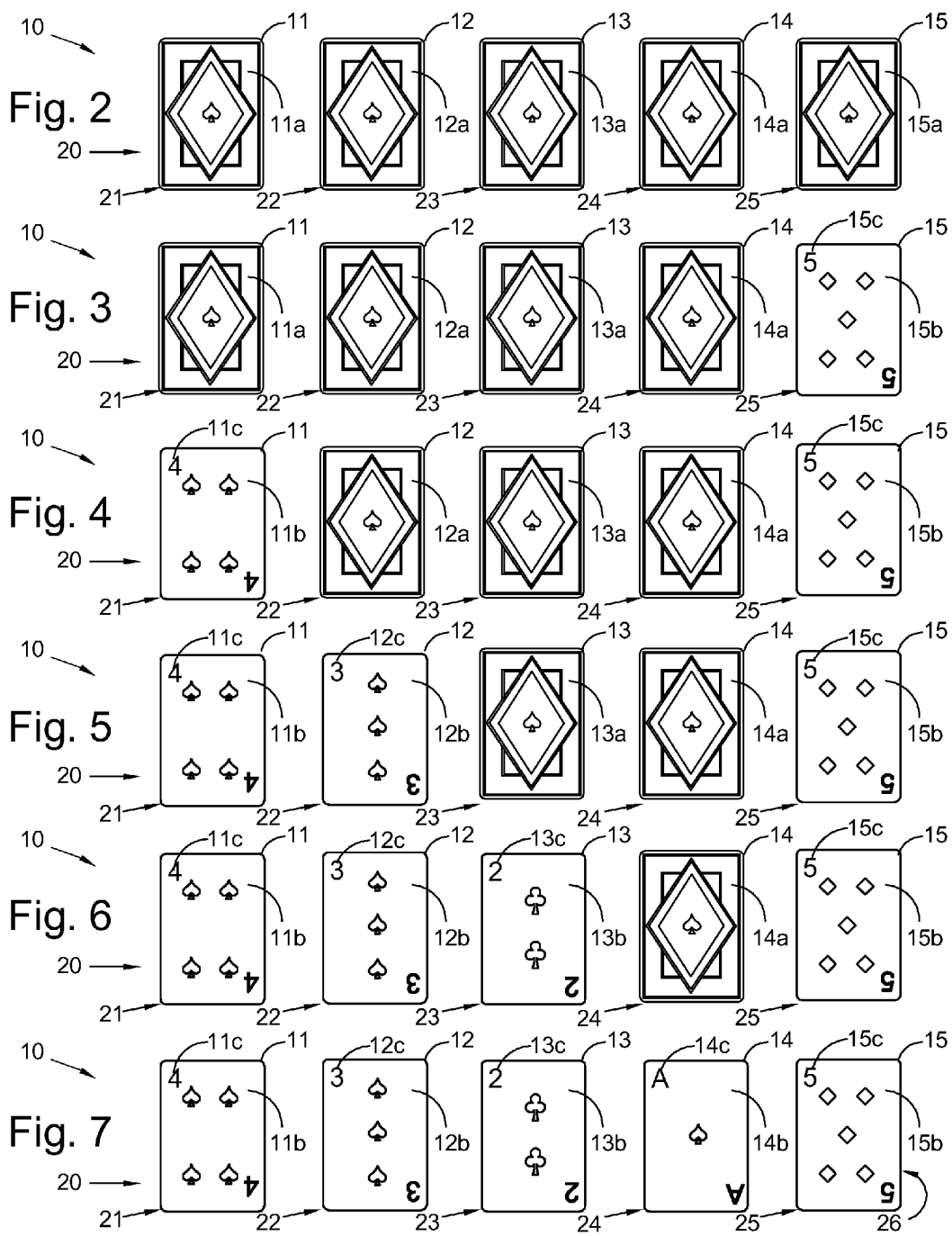

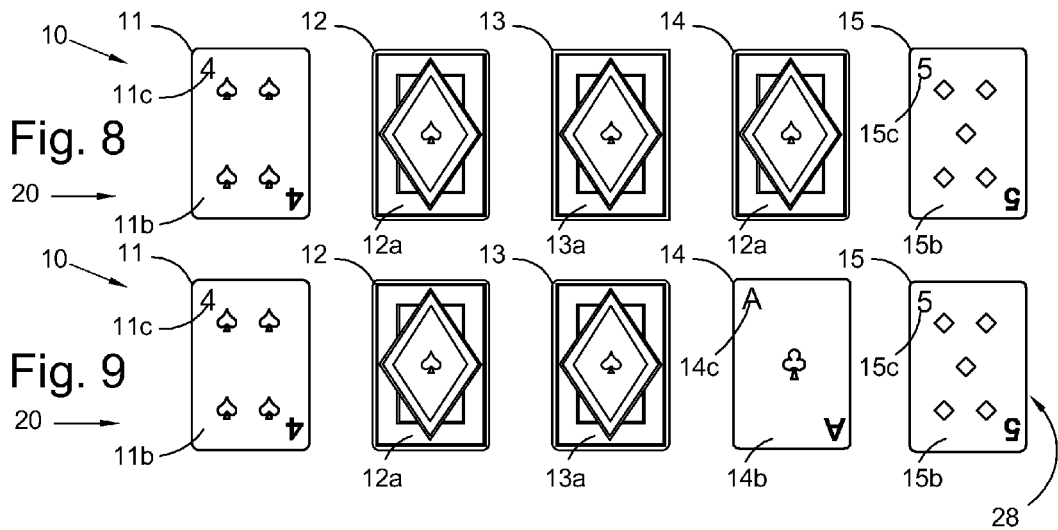
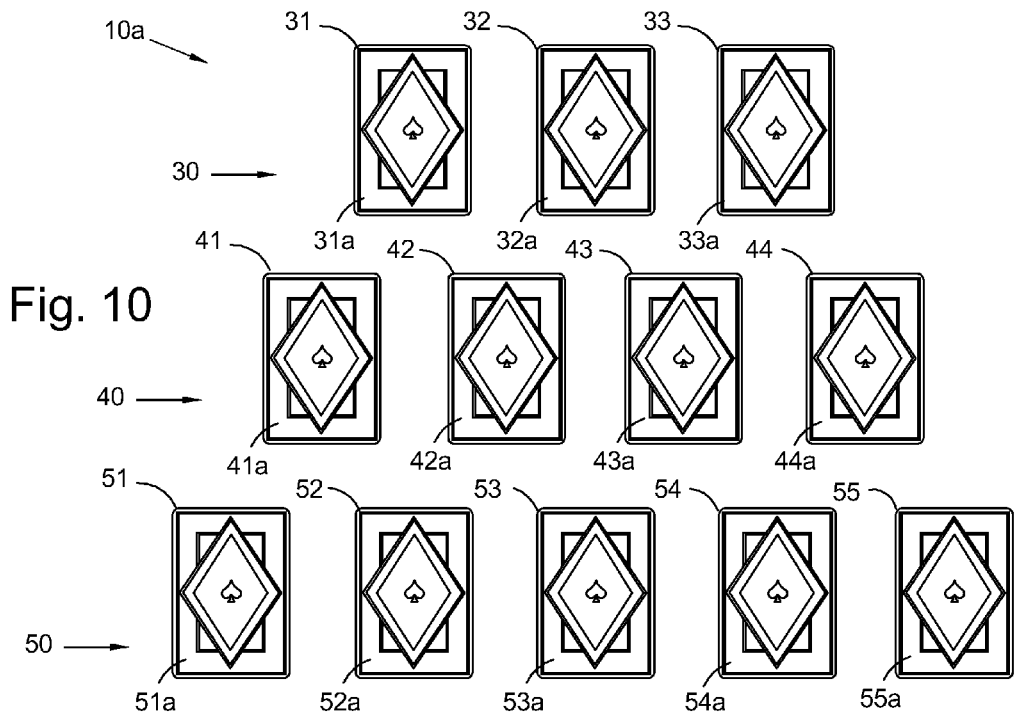

SINGLE PLAYER CARD GAME

FIELD OF THE INVENTION

The invention broadly relates to single player card games, and, more specifically, to a card game with sets of sequentially labeled cards where the value of each card is used to determine the position of a subsequently selected card.

BACKGROUND OF THE INVENTION

Card games are useful for amusement, entertainment, and education. Many card games require two or more players who play against each other to determine a winner. Single player card games are also known for a single player to play against a set of rules in order to attempt to achieve a desired result. Games can be played manually, using a standard deck of cards or electronically via a computerized device, such as a personal computer (PC), personal digital assistant (PDA), cell phone, handheld game system, or the like.

Cards of standard decks each have a suit (e.g., hearts, diamonds, clubs, and spades), and a rank or value (e.g., 2 through 10, Jack, Queen, King, and Ace). Sometimes a player in a single player game must align the cards in ascending or descending order according to the value, rank, or suit of the cards. Games are often designed so that the player does not or can not always win, with a balance between luck and skill that requires the player to take risks and make decisions, thereby resulting in a more satisfying playing experience. That is, players often feel a sense of triumph or accomplishment in overcoming a challenge or solving a puzzle, and will feel a similar sense of reward when presented making a lucky guess.

One limitation of many single player card games is that they are often very complex and require the player to dedicate a large amount of time in order to master or to even play a single round. Furthermore, a large dedication of time may be required to play even a single round of such games. Gaming on portable devices, such as cell phones, smartphones, tablets, and the like, is increasingly popular as players are forced to fit in leisure activities while constantly "on-the-go". Many of the most popular of these games consist of rounds that do not require any more than a matter of minutes to complete. Therefore, there is a constant need for new gaming mechanics that enable fast and fun play while still providing a challenge and risk-reward relationship in order to keep players interested and entertained.

BRIEF SUMMARY OF THE INVENTION

The present invention broadly comprises a method of playing a card game for a single player, including (a) providing a plurality of cards, wherein each card in the plurality has a first side and a second side, wherein the first side of each of the cards includes indicia printed thereon, wherein the indicia on each card is representative of a first value corresponding to each card, (b) placing the cards in at least one row, such that the first side of each card in the at least one row is not viewable by the player, wherein the at least one row comprises a plurality of positions, wherein each card occupies one of the positions in the at least one row, and wherein each position corresponds to at least one second value, wherein the at least one second value for each position is determined by counting from either end of the at least one row, (c) revealing the first side of a selected card from the plurality of cards to determine the first value of the selected card based on the indicia on the selected card, (d) determining a subset of valid cards based on the first value of the selected card and the at least one second value of each of the positions in the at least one row, (e) repeating steps (c) and (d) with subsequently selected cards from the subset of valid cards until the subset of valid cards is empty.

In one embodiment, a win results after step (e) if all cards in the plurality of cards are revealed in iterations of step (c) and a loss results after step (e) if not all cards in the plurality of cards are revealed in iterations of step (c). In one embodiment, the first values of the cards in the at least one row form a sequential set from '1' to 'n', where 'n' is equal to a number of positions in the row. In one embodiment, the at least one second value of each position located at either end of the at least one row comprises both '1' and 'n', where 'n' is equal to a number of positions in the at least one row. In one embodiment, the plurality of cards includes a given card occupying a given position of the plurality of positions, wherein the given card is contained in the subset of valid cards in step (d) if: (i) the given card has not yet revealed its first side in an iteration of step (c); and (ii) the second value of the given position is equivalent to the first value of a most recently revealed of the selected card or the subsequently selected cards.

In one embodiment, the at least one row comprises a plurality of rows, and wherein each row of cards forms a sequential set. In a further embodiment, there are a first number of rows and a second number of cards in each row, wherein the first number is equal to the second number and the rows are arranged in a box layout for forming a plurality of columns, and wherein a third number of the columns is equal to the first and second numbers, and wherein the at least one second value comprises a plurality of second values for each position, wherein the second values of each of the positions is determined by counting from left to right and from right to left in each position's row and by counting from top to bottom and from bottom to top in each position's column. In a further embodiment, the plurality of cards includes a given card occupying a given position of the plurality of positions, wherein the given card is contained in the subset of valid cards in step (d) if: (i) the given card has not yet revealed its first side in step (c) and (ii) the at least one second value of the given position is equivalent to the first value of a most recently revealed of the selected card or the subsequently selected cards.

In one embodiment, a full iteration of steps (c)-(e) is consecutively completed for each row. In one embodiment, a full iteration of steps (c)-(e) is consecutively completed for each row only if all cards in a previous row were revealed. In one embodiment, after completing the full iteration of steps (c)-(e) for one of the rows, wherein the first value of the most recently revealed of the selected card or the subsequently selected card is used to determine the subset of valid cards for a new iteration of step (c) for another full iteration of steps (c)-(e) for a next of the rows. In one embodiment, after fully completing the full iteration of steps (c)-(e) for one of the rows, wherein any card can be the selected card in a new iteration of step (c) for another full iteration of steps (c)-(e) for a next of the rows. In one embodiment, the indicia comprise symbols, shapes, colors, letters, numbers, images, or a combination thereof. In one embodiment, the indicia of at least one of the cards is an 'A' and the first value corresponding to the 'A' is '1'.

The current invention also broadly comprises a method of operating a card game for a single player with a computerized device, the method including (a) generating data representative of a plurality of cards, wherein each card in the plurality corresponds to a first value, and wherein the data representative of the plurality of cards and the first value are stored in a storage unit or a memory unit, (b) displaying first images of the cards with a graphical output device, the first images representative of back sides of the cards, wherein the plurality of cards are displayed arranged in at least one row, wherein the at least one row comprises a plurality of positions, wherein each card occupies one of the positions, and wherein each position has at least one second value, wherein the second values are saved in the memory unit or the storage unit, (c) receiving a selection from the single player via an input device, wherein the selection identifies a selected card from the plurality of cards, (d) displaying a second image of the selected card with the graphical output device, the second image representative of a front side of the selected card, wherein the second image includes indicia representative of the first value of the selected card, (e) determining a subset of valid cards by comparing the first value of the selected card with the second values of the positions with a processing unit, (f) repeating steps (c), (d), and (e) with selections for subsequently selected cards from the subset of valid cards until the subset of valid cards is empty.

In one embodiment, the valid cards are determined if the first value matches the at least one second value for each position in the plurality of positions. In one embodiment, a win results after step (f) if the first side of all cards in the plurality of cards are displayed in iterations of step (d) and a loss results after step (f) if the first side of not all of the cards in the plurality of cards are displayed in iterations of step (d). In one embodiment, a player is awarded a bonus, a credit, a point, a payment, or combinations thereof if the win occurs after step (f), and wherein the bonus, the credit, the point, the payment, or combinations thereof are taken from the player if the loss occurs after step (f). In one embodiment, the graphical output device or an audio output device communicate an audiovisual message, image, sound, song, or combinations thereof.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which:

FIG. 2 is an example layout for playing one embodiment of the present invention with five cards;

FIGS. 3-7 depict one possible scenario of a round of play using the row layout of FIG. 2, where the game results in a win;

FIGS. 8-9 depict a second possible scenario of a round of play, continuing generally from the step shown in FIG. 4, but where the game instead results in a loss;

FIG. 10 is an example layout for one embodiment of the present invention, where the layout resembles a pyramid;

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and, as such, may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs.

Figure 1:
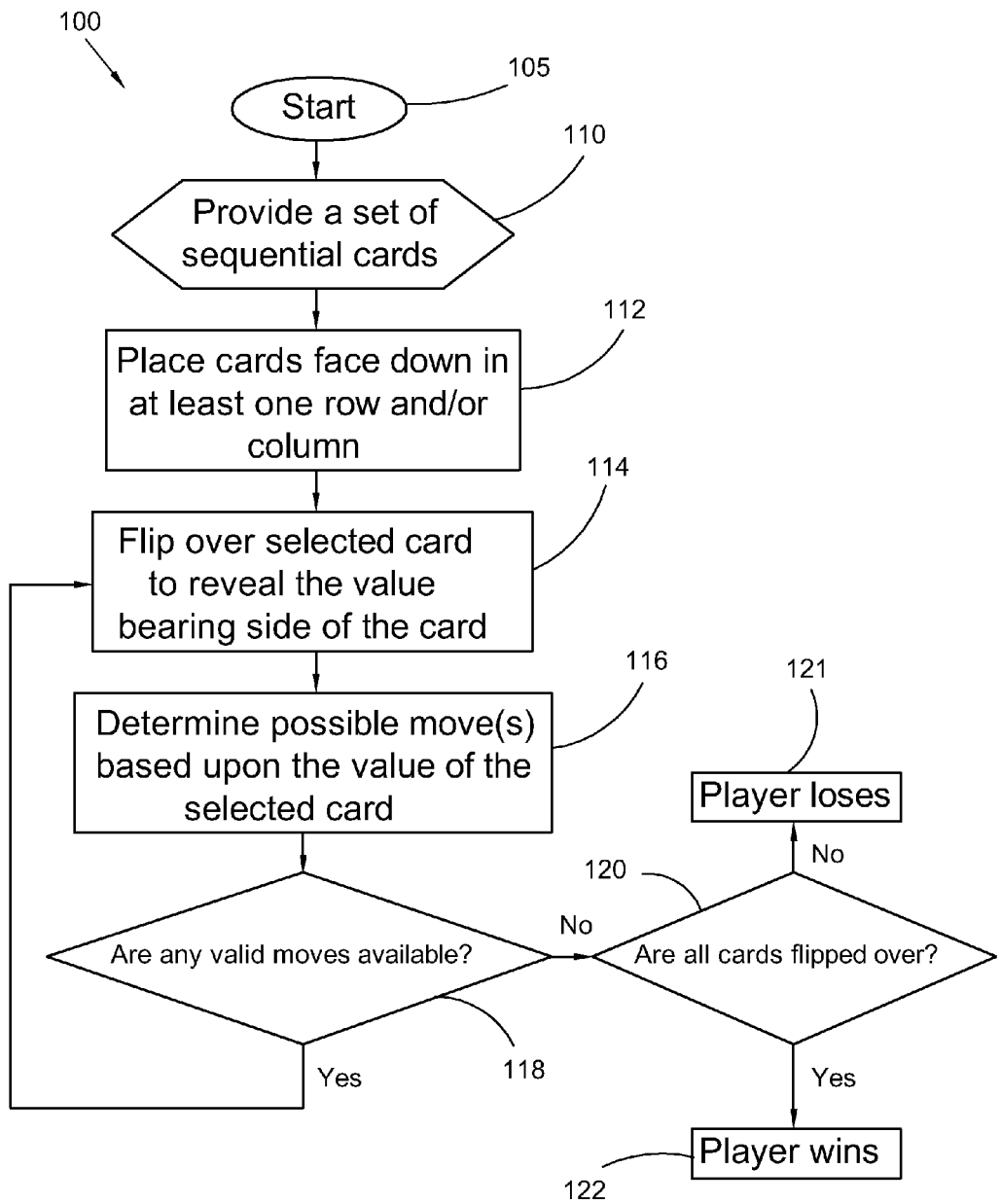
FIG. 1 is a flow diagram illustrating the several steps of playing one embodiment of the single player card game of the present invention.

The method of playing the single player card game, generally designated with reference numeral 100, is shown in the flow diagram of FIG. 1. FIGS. 2-7 illustrate one example of a round of playing game 10 according to method 100. Thus, FIGS. 2-7 are included for providing one specific example of play only, and are not meant to limit the scope of the claims of the current invention.

Referring now to FIGS. 1 through 7, the method of play begins with step 105, in which a player initiates a round of play. In step 110, the player is provided with, or otherwise selects, a set of sequential cards. In this regard, the method according to the present invention could be conducted using conventional playing cards, that is, playing cards having a rank or value of two through ten (e.g., 2, 3, 4, 5, 6, 7, 8, 9, 10), Jack, Queen, King, and Ace, with each card in four different suits (e.g., hearts, diamonds, clubs, and spades). The Jack, Queen, and King could take ranks or values of 11, 12, and 13, respectively, for example, while the Ace takes a rank of 1. Typical playing cards also have a front side and a back side, wherein the rank and suit are displayed on the front, and a generic or general picture, pattern, image, color, etc. is shown on the back. Every card in the same deck might have the same image on the back side such that the cards in the deck are indistinguishable from each other when arranged face down. Accordingly, by "face down", it is meant that only the back side of the card is viewable, and that to "flip over" a card is to reveal the front side that bears the rank and/or suit. It should also be understood that by "sequential", it is meant a set having a regular sequence such as, for example, 1, 2, 3, 4, and so on. The sequential set may alternatively include sets having duplicate numbers, for instance, 1, 1, 2, 2, 3, 3, 4, 4, or the like. Other modifications to sets of cards will become apparent in view of the below disclosure. For example, plain numbered cards could be used having no suits printed thereon, or the suits could be ignored in some rounds of play, such as described in the example of FIGS. 2-7. Lastly, "sequential" may further include any symbols, images, colors, or other indicia indicative of, or correlating to, a regular sequence of numbers. For example, a game could be played with just the "face cards" of a deck, wherein Ace=1, Jack=2, Queen=3, and King=4, in which example the cards would not even have numbers printed thereon, just symbols representative of numbers. The set of sequentially numbered or labeled playing cards selected by or provided to the player should be at least three cards, starting from the value of 1 (represented by a 1 or Ace). For simplicity, anytime an Ace is referred to herein, it is assumed to have the value of '1' or be otherwise interchangeable with a card having the rank of '1' or bearing the number '1' thereon. Thus, if five cards are selected, the game is played with the set {Ace, 2, 3, 4, 5}. Alternatively, as will be better understood with further explanation below, a five card game played with duplicate numbers would be played with {Ace, Ace, 2, 2, 3} while a six card game played with duplicates would be {Ace, Ace, 2, 2, 3, 3}.

As indicated by step 112, each card is placed face down in a grid format. By grid, it is meant a layout that contains at least one row and/or at least one column of playing cards. By column, it is meant a plurality of cards aligned in a top-to-bottom or "vertical" arrangement. By row, it is meant a plurality of cards aligned in a side-by-side or "horizontal" arrangement. Thus, a row is essentially the same as a column in that each comprises a plurality of cards placed adjacently in a line. Accordingly, it should be understood that any use of the term "row" could be interchanged with "column" without affecting the general play of the game. The row and/or column is formed having a sequential set of '1' through 'n' cards, where 'n' is equal to the number of positions in the row or column. For example, FIG. 2 illustrates a grid format, where cards 11-15 are arranged in row 20, with first card 11 having first side 11a; second card 12 having first side 12a; third card 13 having first side 13a; fourth card 14 having first side 14a; and, fifth card 15 having first side 15a. It should be understood that the "first side" is the back side of the card, which does not indicate the value or rank of the card. Thus, the cards are shown face down in FIG. 2, with the values of each card initially hidden.

Each playing card has a physical position in the grid. For example, as shown in FIG. 2, first card 11 is located in position 21; second card 12 is located in position 22; third card 13 is located in position 23; fourth card 14 is located in position 24; and fifth card 15 is located in position 25. Each position corresponds to at least one positional value, which positional value is determined by counting sequentially from the left or right ends of the row in which the card lies (or from the top or bottom ends of columns). In other words, first card 11 is located in, and position 21 corresponds to, a first position (counting from left to right) and a fifth position (counting from right to left); second card 12 is located in, and position 22 corresponds to, a second position (counting from left to right) and a fourth position (counting from right to left); third card 13 is located in, and position 23 corresponds to, a third position (counting from either the left or the right); fourth card 14 is located in, and position 24 corresponds to, a fourth position (counting from left to right) and a second position (counting from right to left); and, fifth card 15 is located in, and position 25 corresponds to, a fifth position (counting from left to right) and a first position (counting from right to left). Simply stated, the five dealt cards have positions equal to their relative placement in the row, counting from the left or the right. In this example, cards in the positions 21, 22, 24, and 25 each correspond to two values, one counted from the left, and the other from the right. In a game having an odd number of cards, the card in the center position, such as position 23, has only one positional value because it is the same when counted from the left or the right. In a row with an even number of cards, all cards will have two positional values. Thus, the positional value(s) for position 21 are '1' and '5'; for position 22 are '2' and '4'; for position 23 is '3'; for position 24 are '4' and '2'; and for position 25 are '5' and '1'.

As indicated in step 114, the player selects one card to reveal a value bearing side, or front side, of the card. In other words, the player selects one card to flip over. For example, in the scenario illustrated in FIGS. 2-7, the player has selected fifth card 15 in step 114, and the fifth card is accordingly shown flipped over in FIG. 3, revealing front, value bearing side 15b of the card.

In step 116, the set of possible move(s) that can be made next by the player is formed based upon the value of the most recently selected card. That is, the number or value of indicia 15c of card 15 determines the next position(s) or card(s) that may be chosen. Specifically, the value of the indicia on the flipped over card defines the subset of valid moves which the player can make next, where the subset includes only those cards in a position having a positional value corresponding to the value of the indicia of the flipped card. For example, in the example of FIGS. 2-7, card 15 is the first card selected and flipped in FIG. 3 revealing indicia 15c having a value of '5'. Therefore the position of the next selected card must correspond to this revealed value of '5'. The possible move(s) based upon the value of '5' are the cards occupying position 21 (the fifth position counting from right to left) and position 25 (the fifth position counting from left to right), since both of these cards are in a position having a positional value corresponding to the value of indicia 15c.

In step 118, it is determined whether any of the possible moves are still valid. By valid, it is meant the card is not only in a position corresponding to the value of the most recently selected card, but it also has not yet been selected. Since card 11 is in position 21, which corresponds to the value of '5' (it is the fifth position when counted from the right), and card 11 has not yet been selected, card 11 represents a valid move.

The query of step 118 results in a 'yes' answer, and method 100 is directed back to step 114, in which step the player must select a new card to be flipped over. Since the player has already selected card 15 in position 25, card 11 in position 21 represents the only valid move, and the player must select card 11 next. After the player flips over card 11, as illustrated in FIG. 4, the method repeats step 116, in which step the next set of valid moves is determined based upon the value of the most recently flipped card. Flipping card 11 reveals indicia 11c on front side 11b, with indicia 11c having a value of '4'. As explained supra, the value of the indicia on the turned over card determines the possible position(s) for selecting the next card.

Accordingly, the next possible moves are determined in step 116 corresponding to the revealed value of '4'. In the presently described five-card game, revealing a value of '4' determines that the player must next choose a card that is in either position 22 (the fourth position counting from right to left) or position 24 (the fourth position counting from left to right). Since neither of cards 12 or 14 in positions 22 or 24 have been selected yet, both of these possible selections represent valid moves, so the answer to the query of step 118 is a 'yes', and the method is again directed back to step 114.

In the scenario illustrated in FIGS. 2-7, it is assumed that the player next selects card 12 in position 22, revealing indicia 12c on front side 12b, as shown in FIG. 5. Indicia 12c has a value of '3', indicating that the next possible move(s) determined in step 116 is card 13 in position 23, since that is the only position that corresponds to the value of three (it is the third position when counted from the left or the right). Since card 13 has not yet been selected, it is determined to be a valid move in step 118, and the method is again redirected to step 114. The player continues to select and flip over cards in reiterations of step 114 based on the most recently revealed value and then determining if there are any valid moves available in step 118 based on the set of possible moves determined in step 116. Thus, since the card that occupies third position 23 has not been selected, i.e., flipped over, the player's only valid move is to select card 13.

It should now be apparent how steps 114, 116, and 118, are repeated to play a round of one embodiment of the current invention game. In the shown example scenario, the player next flips over card 14 in position 24 based on indicia 13c revealed on front side 13b of card 13. Flipping card 14 reveals indicia 14c having a value of '1' (as discussed above, represented by an Ace) on front side 14b, as illustrated in FIG. 6. At this point, a player playing manually (e.g., with a deck of physical cards) would likely recognize that every card is revealed, such that row 20 forms winning layout 26, as shown in FIG. 7. Winning layout 26 consists of an entire grid of flipped over or revealed cards.

For an automated or computerized version of the game, however, the system might run through additional steps of method 100 to determine a win. That is, once card 14 has been flipped over, according to method 100, the computerized system would again determine the next possible moves in step 116 as positions 21 and 25. It would be checked in step 118 if either of these moves is valid. Since both have already been selected, the answer to step 118 would be a 'no', and the method would proceed to step 120. In step 120 it would be checked whether all of the cards are flipped over, with a 'no' result ending in loss 121 and a 'yes' result ending in win 122.

It should be appreciated that method 100 depicts one method for playing a game, and that game 10 depicts one hypothetical round of play, that method 100 and game 10 should not be considered limiting, and that variations on the method and game are possible and within the scope of the current invention. As one example, "duplicate" cards could have been used with card 11 (having the value of '4') being replaced with a second card having a value of '2' (since the second position when counted from the left is equal to the fourth position when counted from the right and vice versa) and/or with card 15 (having the value of '5') being replaced with a second card having a value of '1' or Ace (since the first position when counted from the left is equal to the fifth position when counted from the right and vice versa). As another example, the steps could be rearranged; for example, the query of step 120 could be checked immediately after each step 114 to determine if all cards are flipped over for a win, with the 'no' result of step 120 directed into step 116, and with the 'no' result of step 118 instead resulting in the loss.

As another example, the value indicating indicia (e.g., indicia 11c, 12c, 13c, and/or 15c) of the cards, which are shown as numerals, could be replaced by a set of shapes or symbols corresponding to sequential numbers. For example, indicia 14c in FIGS. 2-7 is already displayed symbolically as an A for Ace, which represents the value of '1'. Accordingly, in other examples: a 'B' could represent the value of 2, a 'C' could represent the value of 3, a 'D' could represent the value of 4, etc.; a circle could correspond to a value of 1, a cross or X could correspond to a value of 2, a triangle could correspond to a value of 3, a square could correspond to a value of 4, etc.; the color red could represent the value of 1, the color orange could represent the value of 2, the color yellow could represent the value of 3, the color green could represent the value of 4, etc.; or a diamond could correspond to the value of 1, a heart could correspond to the value of 2, a spade could correspond to the value of 3, a club could correspond to the value of 4, etc. Similarly, the set may include virtually any combination of colors, patterns, letters, symbols, images, or any other indicia that corresponds to a sequential set of numbers.

As yet another example, the player could have made different decisions during play, resulting in a different outcome, or the cards could have been placed in different positions in step 112. One such example scenario is illustrated in FIGS. 8 and 9 where game 10 results in a loss instead of a win. That is, as shown in FIG. 4 and explained supra, a player selecting a card with a value of '4' has two options, either choose card 12 in position 22 (fourth position counting from left to right) or choose card 14 in position 24 (fourth position counting from right to left). Thus, FIG. 8 resembles FIG. 4 in that cards 15 and 11 have already been selected, and the player is presented with the option of selecting cards 12 or 14 based on card 11 having a value of '4'. In the example scenario of FIGS. 2-7, the player selected card 12, which ultimately resulted in a win. In the example scenario of FIGS. 8-9, it is assumed that the player instead selects card 14 in third iteration of step 114, which reveals an Ace, having a value of '1', as shown in FIG. 9.

Following method 100, the next possible moves determined in step 116 for a player in the situation depicted in FIG. 9, are cards 11 and 15 corresponding to the most recently revealed value of '1'. However, both of these cards have already been selected, meaning that neither are valid options, thereby resulting in a 'no' answer to the query of step 118, which directs the method to step 120. In step 120 of this scenario, not all of the cards are flipped over (i.e., cards 12 and 13 are still face down), so the method terminates as a loss at step 121.

Games according to the current invention are also scalable in complexity. For example, while a row of five-cards is shown in the examples of FIGS. 2-9, such a single row could be extended to a greater number of cards. As another example, game 10a is shown in FIG. 10 having a grid layout resembling a pyramid. That is, game 10a is arranged with several rows of cards, wherein each row is formed from a set of sequential cards, and wherein each row has one additional card. Specifically, first row 30 is formed of sequential cards corresponding to the values 1, 2, and 3; second row 40 is formed of sequential cards corresponding to the values 1, 2, 3, and 4; and third row 50 is formed of sequential cards corresponding to the values of 1, 2, 3, 4, and 5, with the final layout resembling a pyramid. It should be appreciated that the subsequent rows could have the same number of cards of as the previous row, more cards than the previous row, or less cards than the previous row. For example, the layout could resemble a rectangle, pyramid, diamond, etc.

In FIG. 10, first row 30 is seen to comprise first card 31 having first side 31a; second card 32 having first side 32a; and third card 33 having first side 33a. Since row 30 has three cards, the row is played, for example, with {Ace, 2, 3}. Second row 40 is seen to comprise first card 41 having first side 41a; second card 42 having first side 42a; third card 43 having first side 43a; and, fourth card 44 having first side 44a. Row 40 includes one more card than the previous row, i.e., row 30. Thus, row 40 is played with four cards equivalent to {Ace, 2, 3, 4}. Third row 50 is seen to comprise first card 51 having first side 51a; second card 52 having first side 52a; third card 53 having first side 53a; fourth card 54 having first side 54a; and, fifth card 55 having first side 55a. The third row includes one more card then the previous row, i.e., row 40. Thus, row 50 is played with five cards equivalent to {Ace, 2, 3, 4, 5}.

In this version of play, a player completes a full iteration of steps 114, 116 and 118 for each row before progressing to the next row. That is, by "full iteration" it is meant that the steps are repeated as necessary until a result is achieved in step 120. Therefore, each "full iteration" may comprise a plurality of iterations or reiterations of each step. Thus, it can be seen that game 10a follows the general steps of method 100, in that a set or sets (in FIG. 10, three sets) of sequential cards are provided according to step 110, and that the cards are placed face down in at least one row or column (in this case three rows) according to step 112. As explained, supra, each playing card has a physical position in the grid. The values of each card's position in the grid are designated by counting from left to right and/or from right to left. For example, as shown in FIG. 10, first row 30 includes card 31 located in a position having a value of '1' and '3'; second card 32 located in a position having a value of '2'; and third card 33 located in a position having a value of '3' and '1'. In this example of play, the player must first successfully win row 30 in order to start on row 40, and win row 40 to start on row 50, and win row 50 to win the entire game.

Figure 11:
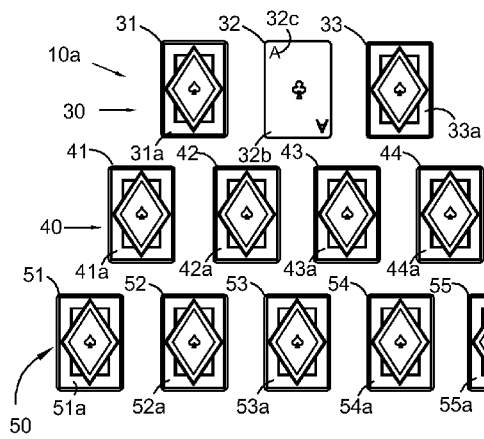
FIGS. 11-14 depict a possible scenario of a partial round of play using the pyramid layout of FIG. 10.

Again referring to method 100 in FIG. 1, after the cards are placed in the arrangement of FIG. 10 according to step 112, a card is selected by the player from first row 30 revealing a value bearing side of the card in accordance with step 114. One example of play for game 10a is shown in FIGS. 11-14. In FIG. 11, it is shown that card 32 has been selected and flipped over, revealing value bearing side 32b of the card. Like the above described methods of play, the value of card 32, indicated by indicia 32c, represents the possible position (s) of the next card that can be chosen by the player, as determined in step 116. Also as described above, valid moves, as determined in step 118, correspond with the possible cards identified in step 116 that have not been selected yet. For example, since the value of indicia 32c is '1', as represented by the 'A' for Ace, the player must next select either card 31, which is in the first position when counting from left to right, or card 33, which is in the first position when counting from right to left. Based on the above discussion of game 10 it should be clear how steps 114, 116, and 118 are repeated in order to complete row 30.

Figure 12:
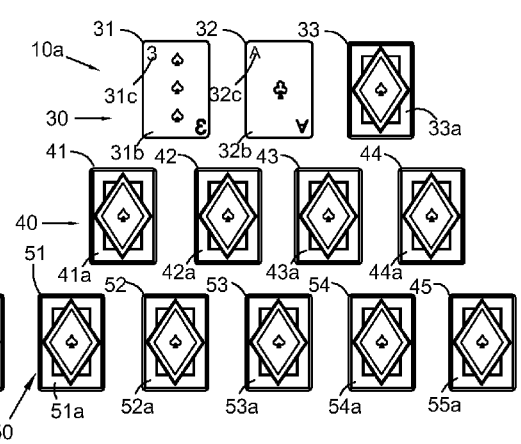
Figure 13:
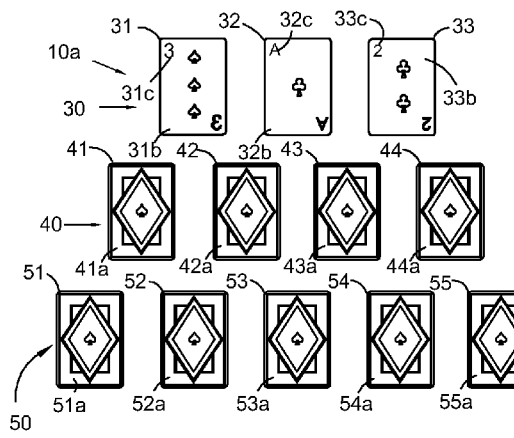

Thus, it can be seen that the player has "won" row 30 in FIGS. 11-13. That is, FIG. 12 illustrates card 31 being selected first to reveal front side 31b having indicia 31c corresponding to a value of '3'. Since card 31 has already been selected, the player's only valid move is to select card 33, revealing value bearing side 33b, as illustrated in FIG. 13. Now that all the playing cards in row 30 are selected and turned over, the player can proceed to the next row, i.e., row 40. That is, it should be apparent that method 100 could be modified slightly, such that once a player has reached step 120 with a 'yes' result for a given row, the player is directed back to step 114 for the subsequent row, while a 'no' result in step 120 still results in a loss. The player only truly wins the entire game by getting a 'yes' result in step 120 for each row in the initially placed grid.

Figure 14:
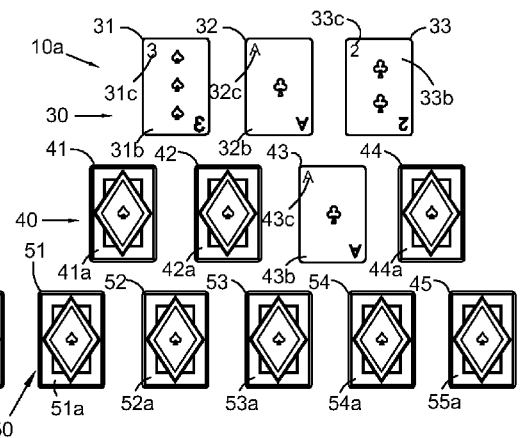

FIG. 14 shows card 43 flipped over to reveal value bearing side 43b, which has indicia 43c corresponding to a value of '1'. After winning row 30, the first selection in a new row, e.g., card 43 in this example, could have been randomly or purposefully selected by the player, or the player might have to pick a card corresponding to the last card flipped in the previous row. For example, card 33 in row 30 was the last card selected in order to win that row, and card 33 corresponded to a value of '2', and this value of '2' could be used to determine the cards that the player must select to start the next row, i.e., row 40. For example, the value of '2' on the last card selected in row 30 could require the player to start row 40 by selling either card 42 or card 43, which cards are in positions corresponding to the value of '2'. Only a first move for row 40 is shown in FIG. 14, and the rest of game 10a is not illustrated step-by-step since it should now be clear how a player would continue to play (repeating steps 114, 116, 118, and 120, as discussed above) until winning or losing in row 40, before attempting row 50, and again repeating the steps to see if the player can win all rows. That is, the process of selecting cards is repeated starting in each subsequent row and continued until the value of all the cards in each row are flipped face up for a win, or until there are no valid moves for the player to make and not all the cards have been flipped over for a loss. It should be understood that variations of this "pyramid" embodiment game can be made without departing from the spirit and scope of the invention. For example, rather than have the player turn over all the cards in a row before proceeding to the next row, in a variation of the game the player might play each row until a win or a loss is achieved, with the player, for example, trying to obtain over a certain number or percentage of wins, competing against another player for numbers of wins, etc.

Figure 15:
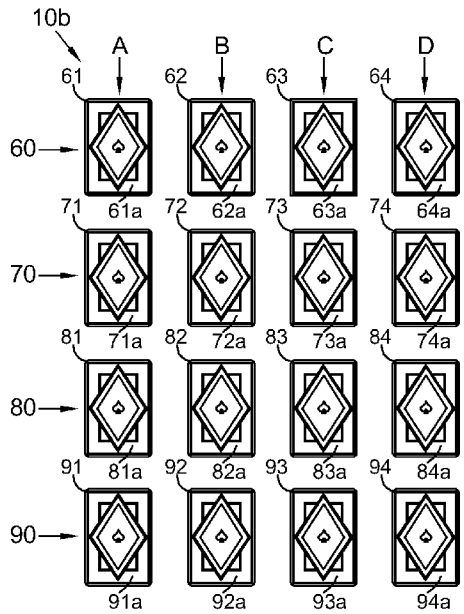
FIG. 15 is an example layout for one embodiment of the present invention, where the layout resembles a box or square.

Another variation of the game that adds a further level of skill and judgment is possible by dealing several sets of sequentially numbered cards so that the number of rows equals the number of columns. In this embodiment, each card corresponds to both a column and a row, with the card layout resembling a box or square. For example, one example of a layout for game 10b is shown in FIG. 15. The grid in game 10b is formed by first row 60, which comprises first card 61 having first side 61a, second card 62 having first side 62a, third card 63 having first side 63a, and, fourth card 64 having first side 64a; second row 70, which comprises first card 71 having first side 71a, second card 72 having first side 72a, third card 73 having first side 73a, and, fourth card 74 having first side 74a; third row 80, which comprises first card 81 having first side 81a, second card 82 having first side 82a, third card 83 having first side 83a, and fourth card 84 having first side 84a; and, fourth row 90, which comprises first card 91 having first side 91a, second card 92 having first side 92a, third card 93 having first side 93a, and, fourth card 94 having first side 94a. The number of rows in game 10b is equal to the number of columns. Specifically, FIG. 15 shows four rows and four columns, in which column A includes card 61, card 71, card 81, and card 91; column B includes card 62, card 72, card 82, and card 92; column C includes card 63, card 73, card 83, and card 93; and, column D includes card 64, card 74, card 84, and card 94.

Similar to the previous embodiments, each playing card has a physical position in the grid, in which the value or values of the card's position is designated by counting from left to right and from right to left for each row. For example, first row 60 includes card 61 located in a first position (counting from left to right) and a fourth position (counting from right to left); second card 62 located in a second position (counting from left to right) and a third position (counting from right to left); third card 63 located in a third position (counting from left to right) and a second position (counting from right to left); and, fourth card 64 located in a fourth position (counting from left to right) and a first position (counting from right to left). Unlike the previous embodiments, the position of each card in the grid is also designated by counting from top to bottom and from bottom to top. For instance, column A comprises: card 61 located in a first position (counting from top to bottom) and a fourth position (counting from bottom to top); card 71 located in a second position (counting from top to bottom) and a third position (counting from bottom to top); card 81 located in a third position (counting from top to bottom) and a second position (counting from bottom to top); and, card 91 located in a fourth position (counting from top to bottom) and a first position (counting from bottom to top). The same position arrangement applies to all the rows and columns in the grid. Thus, in the example of FIG. 15, each position corresponds to four values, with two values for the position with respect to the row, and two values for the position with respect to the column.

To begin the game, a desired set of sequentially numbered cards are dealt so that the number of rows equals the number of columns. For example, if a nine-card grid is chosen as the desired layout, then three sets of sequential cards are shuffled separately and dealt into three rows or three columns face down. Game 10b in FIGS. 15 through 18 involves a grid of sixteen cards, therefore, four rows and four columns of cards are randomly dealt from the group of cards comprising four sets of sequential cards where each set is equivalent to {Ace, 2, 3, 4}.

It should be appreciated that every row, or every column, but not necessarily both, should have one card corresponding to each value. For example, in a computerized version, it would be simple to ensure that both rows and columns have exactly one of each valued card (because this arrangement can be checked by a software function, for example). However, this would not be as practical in a manual version of the game, unless a secondary dealer player were to help arrange the cards for the player (the player would know where every card was if the player arranged the cards). That is, each row may comprise a set of sequential cards (therefore including one of each valued card), while the columns may have repeated cards, or vice-versa.

Figure 16:
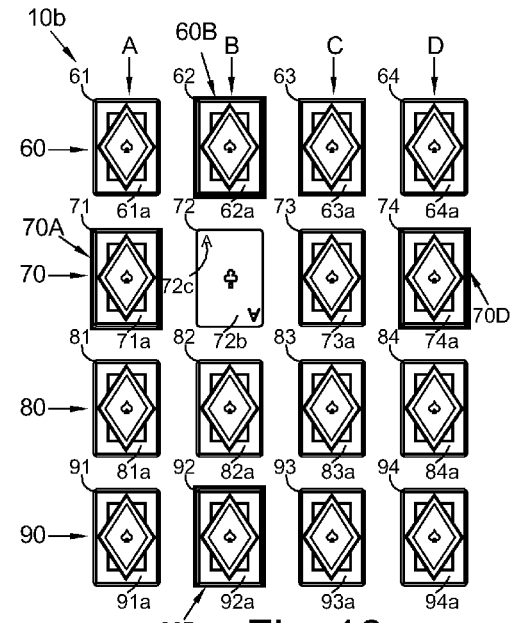
FIGS. 16-18 depict a possible scenario of a partial round of play using the box layout of FIG. 15; and, FIG. 19 a block diagram of a computer system that could be used to run the present invention method.
Figure 17:
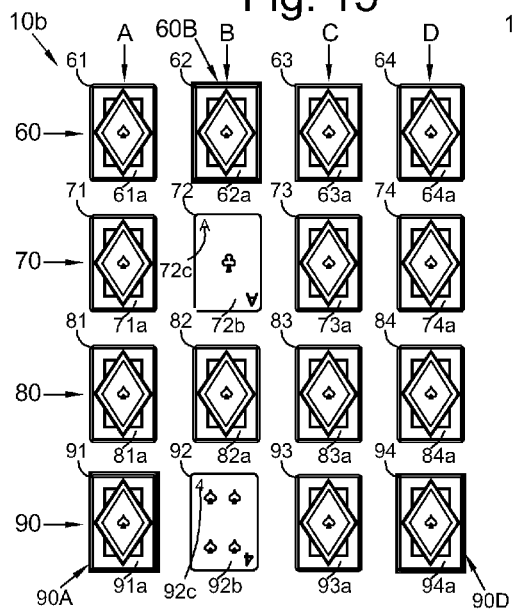
Figure 18:
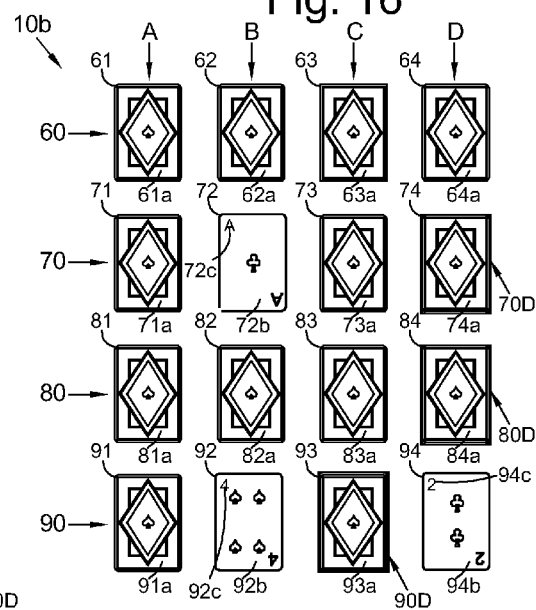

FIGS. 16-18 illustrate one example or possible scenario of play starting with the initial box-layout of game 10b as shown in FIG. 15. Like the previously described scenarios, FIGS. 16-18 illustrate merely one possible round of play for the purposes of discussion only. After the cards have been arranged in sequential sets according to step 110, and the cards are placed in at least one row/column according to step 112 and as shown in FIG. 15, the player then selects a card in the first iteration of step 114. In this example scenario, card 72 is selected first (in accordance with step 114), revealing face side 72b having indicia 72c corresponding to a value of '1'. As explained, supra, the value of indicia 72c of card 72 represents the position(s) of the next card that may be chosen by the player. Since the value indicated by indicia 72c is 1, the next possible moves determined in step 116 are: card 71, which is in position 70A (the first position counting from left to right in row 70, the same row as selected card 72); card 73, which is in position 70D (the first position counting from right to left in row 70, the same row as the selected card 72); card 62, which is in position 60B (the first position counting from top to bottom in column B, the same column as selected card 72) or card 92, which is in position 90B (the first position counting from bottom to top in column B, the same column as selected card 72). Since none of these possible moves have been selected yet, all of them are considered valid and the method is redirected to step 114.

In this example scenario, the player is assumed to select card 92, which is shown flipped over in FIG. 17, revealing value bearing side 92b having indicia 92c corresponding to a value of 4. Since the value of card 92 is 4, the next possible moves are: card 91, which is in position 90A (the fourth position counting from right to left in row 90, the same row as selected card 92); card 94, which is in position 90D (the fourth position counting from left to right in row 90, the same row as selected card 92); card 92, which is in position 90B (the fourth position counting from top to bottom in column B, the same column as card 92); or card 62, which is in position 60B (the fourth position counting from bottom to top in column B, the same column as selected card 92). However, since card 92 was just selected, it does not represent a valid choice, although the other three cards do. Since there are valid moves, a 'yes' results in step 118 and the method is again redirected to step 114.

Similarly, it is assumed that the player next selects card 94, as FIG. 18 illustrates value bearing side 94b of card 94 having indicia 94c with a value of 2. Going through both steps 116 and 118, since the value of indicia 94c is 2, in the next iteration of step 114 the player must select: card 93, which is in position 90D (the second position counting from right to left in row 90, the same row as selected card 94); card 74, which is in position 70D (the second position counting from top to bottom in column D, the same column as selected card 94); or card 84, which is in position 80D (the second position counting from bottom to top in column D, the same column as selected card 94). It should be understood by now that card 92 represents a possible move in step 116, but not a valid move in step 118, since it has already been selected. These steps of selecting valid cards based upon the value of the previously selected card are repeated until no valid moves remain (a 'no' answer in step 118), where the game terminates in win 122 if all of the cards in game 10b are flipped face up (a 'yes' answer in step 120), or in loss 121 if not all cards have been flipped over (a 'no' answer in step 120).

Figure 19:
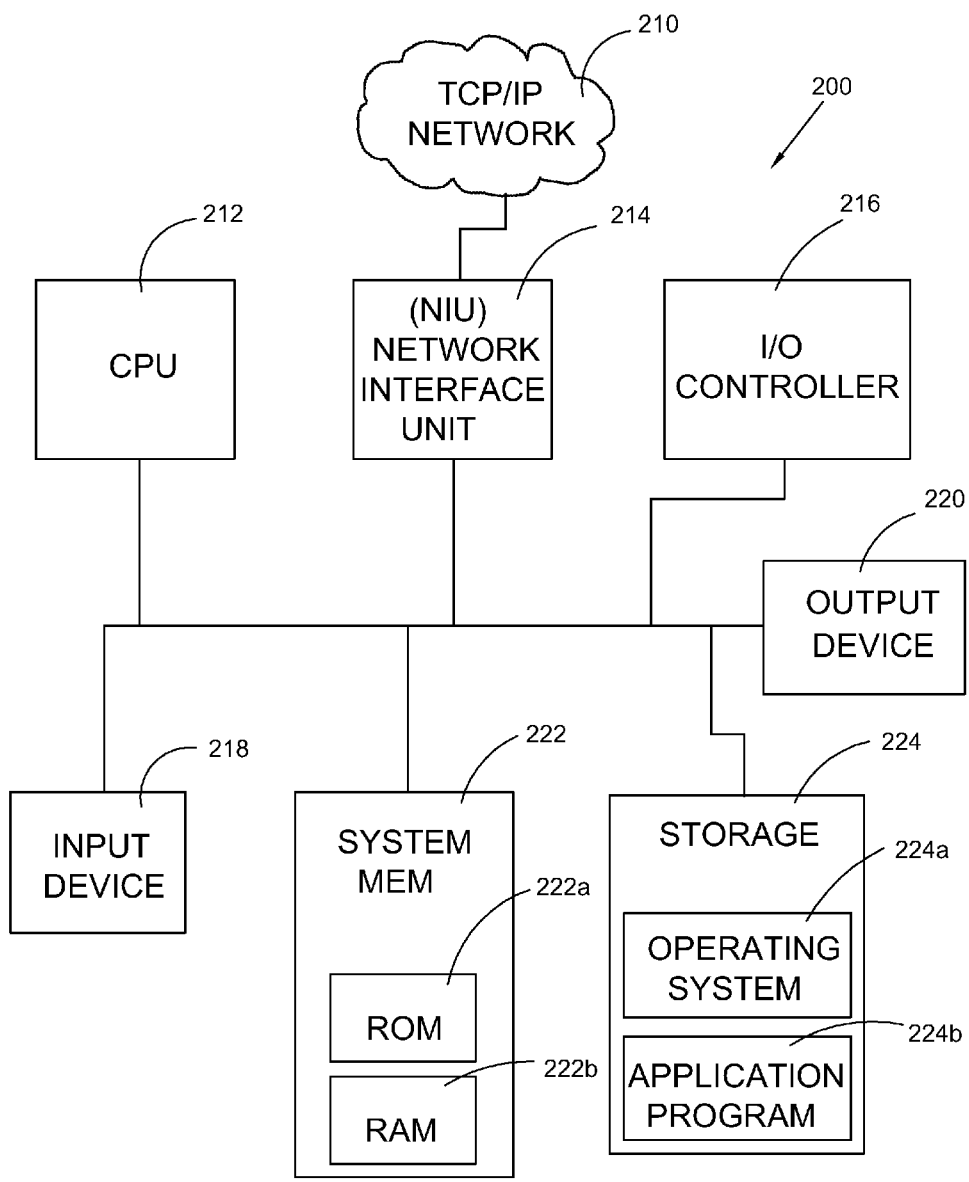

FIG. 19 is a block diagram of computer system 200, which may be utilized by a player to play an electronic version of the current invention game according to a method similar to method 100, shown in FIG. 1. Method 100, or some variation thereof, for example, could be run as a software application on computer 200, which could be, for example, a cell phone, a smart phone, a portable, hand-held, or other gaming console, a desktop computer, a laptop computer, a gaming kiosk or terminal, etc. The software may be stored locally on the device or remotely accessible across a server, such as the internet. Computer system 200 may be a general-purpose computer, a specially designed computer, or any device having at least some of the features or capabilities as those described below in relation to computer system 200. Computer system 200 includes a bus connected in a known manner to provide data transfer paths between various hardware components.

The system includes a processor or processing means, such as central processing unit (CPU) 212. Network interface unit (NIU) 214, or some other communication device may be in communication with CPU 212 across the bus for enabling computer 200 to communicate with other computers, servers, clouds, networks, etc. in any known manner. That is, unit 214 may communicate with other networks, such as the Internet, extranets, intranets, Wi-Fi, cellular networks, satellite networks, or other data networks such as a TCP/IP network 210. Input/output (I/O) device controller 216 is coupled to CPU 212 for controlling peripheral devices. For example, computer system 200 comprises input device 218, which is operatively arranged to receive input from the user, such as a keyboard, mouse, trackball, or other pointing device, touch pad, or touch screen, all of which are well known in the field of computing. Computer system 200 may also comprise an output device 220, such as a cathode ray tube (CRT), touch screen, liquid crystal display (LCD), speakers, headphones, or other audiovisual devices for communicating information to a computer user. For example, audiovisual signals, alerts, messages, images, sounds, songs, etc. could play as a result of a win or a loss. CPU 212 is in data communication with system memory 222, which comprises read only memory (ROM) 222a and/or random access memory (RAM) 222b. System memory 222, is included for example, to store information and instructions to be executed by the CPU 212. Computer system 200 also comprises storage 224, which is a data storage device that communicates with CPU 212, such as a hard disk drive, flash memory drive, solid state drive, etc. It should be understood that storage 224 could alternatively or additionally comprise computer readable removable media, such as a magnetic or optical disks (including but not limited to magnetic tapes, laser disks, or CD-ROMs, DVDs, etc.) that are coupled to the I/O device. Operating system 224*a* and application program 224*b* are software or other computer code stored in storage device 224 and utilized for controlling the operation of the various hardware components. It should be understood that storage 224 could be local or remotely accessible through a cloud or network. It should be understood that system 200 may include additional components not mentioned above, alternatives to those components listed above, or may lack some of the components mentioned above, and that these computing components and their alternatives and equivalents are well known.

For example, it should be appreciated that in computerized versions of the current invention games, data representative of the cards, the values of the cards, the positional values of the positions, and all other information could be stored or storable in storage unit 224 and/or memory 222. Furthermore, the input device, such as a mouse, touch screen, or keyboard, could be used by the player to select a card to flip over. Furthermore, the front and back sides of the cards could be displayed by output device 220 as electronic, digital or computer images and not embody physical cards. Also, the CPU or other processing unit could be used to do perform comparing or determining, such as comparing the value of the cards with the positional values of the positions and determining which cards have already been flipped in order to complete steps 116, 118, and 120, or equivalents thereof. The computerized system may reject a selection which by the player in a reiteration of step 114 that is determined to be invalid based on the comparing/determining in the previous iteration of steps 116 and 118.

Thus, it should be appreciated that the current invention game could be played for fun, entertainment, leisure, or for prizes in a casino, arcade, or other gaming or gambling establishment. For example, in a casino, arcade, or gaming establishment, a player may have to make a bet in step 105 to initiate play. For example, device 200 could be a video gaming terminal running software including instructions for method 100, where the player must enter payment, such as a quarter or token, into device 200 to start the game, and wherein a credit, bonus, award, payment, points, etc. are awarded to the player in the event that the player wins or taken from the player in the event of a loss. In this way, for example, the player could aim to collect these points, credits, etc. to redeem them for money, prizes, etc., or to set a "high-score" (that is recorded, for example, in storage 224 and/or memory 222) for the player or other players to attempt to beat, etc. In another example, in order for the game to be initiated, the player might first have to play another, "primary" game, such as a hand of blackjack in a casino, with the current invention game initiating as a "bonus" game in step 105 only if the a certain event occurs in the primary game, such a win or a loss.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What is claimed is:

1. A method of playing a card game for a single player, using a processor to perform the following steps, comprising:
   (a) providing a plurality of cards, wherein each card in said plurality has a first side and a second side, wherein said first side of each of said cards includes indicia printed thereon, wherein said indicia on each card is representative of a first value corresponding to each card;
   (b) placing said cards in at least one row, such that said first side of each card in said at least one row is not viewable by said player, wherein said at least one row comprises a plurality of positions, wherein each card occupies one of said positions in said at least one row, and wherein each position corresponds to at least one second value, wherein said at least one second value for each position is determined by counting from either end of said at least one row;
   (c) revealing said first side of a selected card from said plurality of cards to determine said first value of said selected card based on said indicia on said selected card;
   (d) determining a subset of valid cards based on said first value of said selected card and said at least one second value of each of said positions in said at least one row;
   (e) repeating steps (c) and (d) with subsequently selected cards from said subset of valid cards until said subset of valid cards is empty.

2. The method of claim 1 wherein a win results after step (e) if all cards in said plurality of cards are revealed in iterations of step (c) and a loss results after step (e) if not all cards in said plurality of cards are revealed in iterations of step (c).

3. The method of claim 1, wherein said first values of said cards in said at least one row form a sequential set from '1' to 'n', where 'n' is equal to a number of positions in said row.

4. The method of claim 1, wherein said at least one second value of each position located at either end of said at least one row comprises both '1' and 'n', where 'n' is equal to a number of positions in said at least one row.

5. The method of claim 1, wherein said plurality of cards includes a given card occupying a given position of said plurality of positions, wherein said given card is contained in said subset of valid cards in step (d) if: (i) said given card has not yet revealed its first side in an iteration of step (c); and (ii) said second value of said given position is equivalent to said first value of a most recently revealed of said selected card or said subsequently selected cards.

6. The method of claim 1, wherein said at least one row comprises a plurality of rows, and wherein each row of cards forms a sequential set.

7. The method of claim 6, wherein there are a first number of rows and a second number of cards in each row, wherein said first number is equal to said second number and said rows are arranged in a box layout for forming a plurality of columns, and wherein a third number of said columns is equal to said first and second numbers, and wherein said at least one second value comprises a plurality of second values for each position, wherein said second values of each of said positions is determined by counting from left to right and from right to left in each position's row and by counting from top to bottom and from bottom to top in each position's column.

8. The method of claim 7, wherein said plurality of cards includes a given card occupying a given position of said plurality of positions, wherein said given card is contained in said subset of valid cards in step (d) if: (i) said given card has not yet revealed its first side in step (c) and (ii) said at least one second value of said given position is equivalent to said first value of a most recently revealed of said selected card or said subsequently selected cards.

9. The method of claim 6, wherein a full iteration of steps (c)-(e) is consecutively completed for each row.

10. The method of claim 6, wherein a full iteration of steps (c)-(e) is consecutively completed for each row only if all cards in a previous row were revealed.

11. The method of claim 9, after completing said full iteration of steps (c)-(e) for one of said rows, wherein said first value of said most recently revealed of said selected card or said subsequently selected card is used to determine said subset of valid cards for a new iteration of step (c) for another full iteration of steps (c)-(e) for a next of said rows.

12. The method of claim 9, after fully completing said full iteration of steps (c)-(e) for one of said rows, wherein any card can be said selected card in a new iteration of step (c) for another full iteration of steps (c)-(e) for a next of said rows.

13. The method of claim 1, wherein said indicia comprise symbols, shapes, colors, letters, numbers, images, or a combination thereof.

14. The method of claim 13, wherein said indicia of at least one of said cards is an 'A' and said first value corresponding to said 'A' is '1'.

15. A method of operating a card game for a single player with a computerized device, the method comprising:
   (a) generating data representative of a plurality of cards, wherein each card in said plurality corresponds to a first value, and wherein said data representative of said plurality of cards and said first value are stored in a storage unit or a memory unit;
   (b) displaying first images of said cards with a graphical output device, said first images representative of back sides of said cards, wherein said plurality of cards are displayed arranged in at least one row, wherein said at least one row comprises a plurality of positions, wherein each card occupies one of said positions, and wherein each position has at least one second value, wherein said second values are saved in said memory unit or said storage unit;
   (c) receiving a selection from said single player via an input device, wherein said selection identifies a selected card from said plurality of cards;
   (d) displaying a second image of said selected card with said graphical output device, said second image representative of a front side of said selected card, wherein said second image includes indicia representative of said first value of said selected card;
   (e) determining a subset of valid cards by comparing said first value of said selected card with said second values of said positions with a processing unit;
   (f) repeating steps (c), (d), and (e) with selections for subsequently selected cards from said subset of valid cards until said subset of valid cards is empty.

16. The method recited in claim 15, wherein said valid cards are determined if said first value matches said at least one second value for each position in said plurality of positions.

17. The method recited in claim 15, wherein a win results after step (f) if said first side of all cards in said plurality of cards are displayed in iterations of step (d) and a loss results after step (f) if said first side of not all of said cards in said plurality of cards are displayed in iterations of step (d).

18. The method recited in claim 17, wherein a player is awarded a bonus, a credit, a point, a payment, or combinations thereof if said win occurs after step (f), and wherein said bonus, said credit, said point, said payment, or combinations thereof are taken from said player if said loss occurs after step (f).

19. The method recited in claim 17, wherein said graphical output device or an audio output device communicate an audiovisual message, image, sound, song, or combinations thereof.

* * * * *